United States Patent [19]

Demmeler

[11] 3,855,475

[45] Dec. 17, 1974

[54] UV-SPECTROGRAPHIC ANALYSIS OF BERYLLIUM AND CARBON FOR DETERMINING NUCLEAR REACTOR FUEL ELEMENT CONSUMPTION

[75] Inventor: Martin Demmeler, Grosshesselohe, Germany

[73] Assignee: Kernforschungsanlage Julich Gesellschaft mit beschrankter Haftung, Julich, Germany

[22] Filed: Dec. 18, 1972

[21] Appl. No.: 316,257

[30] Foreign Application Priority Data
Dec. 23, 1971 Germany............................ 2164098

[52] U.S. Cl.................................. 250/372, 356/86
[51] Int. Cl. .......................................... G03b 27/04
[58] Field of Search ................. 250/372; 356/86, 85

[56] References Cited
UNITED STATES PATENTS
3,144,551  8/1964  Webb et al. ..................... 356/86 X
3,248,602  4/1966  Irish et al. ........................ 356/86 X
3,669,546  6/1972  Virloget .............................. 356/86

Primary Examiner—Archie R. Borchelt
Attorney, Agent, or Firm—Walter Becker

[57] ABSTRACT

A method of determining the consumption of fuel elements for nuclear reactors, according to which the fuel is contained in a graphite covering or matrix. Traces of the component parts of the surface of a fuel element are volatized in an electric arc, and the arc light is split up by means of a UV-spectrograph. Subsequently, the lines of the carbon and of the beryllium formed during the irradiation in the reactor are scattered, whereupon the intensity proportion of one or more of the beryllium lines lying in the UV region and one or more of the carbon lines lying in the UV region are compared with one another.

2 Claims, No Drawings

UV-SPECTROGRAPHIC ANALYSIS OF BERYLLIUM AND CARBON FOR DETERMINING NUCLEAR REACTOR FUEL ELEMENT CONSUMPTION

The present invention relates to a method of determining the consumption of fuel elements for nuclear reactors, according to which the fuel is contained in a graphite covering or matrix.

Such a determination is desirable, since the consumption state of a fuel element influences its mechanical properties, especially its strength. Changed moreover during the introduction in the reactor are the heat conductivity and the retaining capacity of the covering or the matrix for the cleavage or fission products which are obtained with the fission process which occurs during the insertion in the reactor. Depending on the consumption state, the fuel elements are either subjected to a refining process or are again used in the reactor.

Because of the significance for the further handling of fuel elements, various methods for the determination of the consumption have already been developed. Thus it is already known in the art to determine the consumption of fuel elements by comparing, with the help of a highly resolving gamma spectroscope, intensities of two or more characteristic gamma lines of the gamma rays emitted from the fission products of the fuels. However, the drawback of this method consists in that the resolving capacity of the heretofore known gamma spectroscopes is not sufficient for adequately distinguishing the gamma lines from the radiation level of the irradiated elements with the precision necessary for the desired determination of the consumption. In addition, this method takes a relatively long amount of time. The method is not usable especially if — as this is generally the case in nuclear reactors — the fuel has been exposed to a relatively strong radiation.

Another known method used for the determination of the consumption of fuel elements, according to which the fuel is arranged in a spherical graphite covering, is characterized in that the fuel elements, after passing through the nuclear reactor, are passed through a measuring reactor, whereby the reactivity of the measuring reactor, which is changed as a result of the passing through, is determined. Aside from the fact that a high expenditure is involved in providing a measuring reactor, for which in addition the necessary technical safety precautions must be taken, the distinguishing of elements with a high rate of consumption and less consumed elements is made difficult for the reason that in addition in this connection the change in the reactivity, which is caused by the neutron contamination, enters into the measurement result. To avoid this, it is necessary to store the fuel elements for the duration of several halflife periods of the isotope Xe 135, before the consumption determination can be undertaken. The determination of the consumption according to this method therefore also requires a great amount of time.

In order to carry out in a short amount of time the consumption determination of fuel elements, with which graphite structural materials are used, the carbon covering or matrix has already been doped with an element which is capable of being consumed in the thermal neutron field of a nuclear reactor and whose emission spectroscopic detection is possible. However, this known step presupposes an artificial contamination of the graphite material with a neutron poisoning. This is disadvantageous in regard to the neutron economy of the nuclear reactor. In addition, it is difficult to find elements having the proper properties which at the same time will not affect the graphitizing process and the strength properties of the graphite. A further disadvantage exists finally in that this step requires a very precise blending of the starting materials, since variable concentration distributions lead to incorrect measurement results. In addition thereto, different fuel element temperatures and a withdrawal diffusion resulting therefrom lead to inhomogeneities, so that for this reason also the measurement results are subjected to uncertainties, if not even with unacceptable errors.

It is an object of the present invention to provide a method for determining the consumption of fuel elements for nuclear reactors, according to which the consumption of a fuel element will take place within a short time span, in a simple manner, and with relatively little apparatus expenditure.

It is a further object of the present invention that the results not be disadvantageously influenced by contamination with cleavage or fission products resulting from poisoning. Nor shall the measurement results be affected by strong gamma ray fields which happen to exist.

With these and other objects in mind, the method according to the present invention is characterized primarily in that, with the use of graphite as structural material of the fuel element, the following nuclear reaction occurs in the nuclear reactor during insertion:

$$C^{12}(n,a)Be^9 \quad E_{threshold} > 6.6 \text{ MeV}$$

It is also possible to spectroscopically identify the beryllium formed in this connection. The invention is further characterized in that in the ultra violet region, especially the emission lines of beryllium of 2348.61 A., 3130.42 A., and 3130.07 A. are spectroscopically identifiable. In addition, there is the realization that beryllium has an extremely low capture or absorption cross section for thermal neutrons, so that the consumption of the beryllium in thermal neutron fields is negligible, from which it follows that practically a linear relation exists between the beryllium content in the graphite used as structural material and the radiation dose of the carbon of the structural material by neutrons with a threshold energy above that required for the formation of the beryllium. Finally, in order to realize the objects of the invention, it is necessary to determine that the initial or starting concentration of possible impurities with the graphite used for the manufacture of the fuel elements lies below the detectable limit.

Proceeding from this knowledge, the invention is further characterized in that traces of the component parts of the surface of a fuel element are volatized in an electric arc and the arc light is split up by means of a UV-spectrograph; subsequently, the lines of the carbon and of the beryllium formed during the irradiation in the reactor are scattered, whereupon the intensity proportion of one or more of the beryllium lines lying in the UV region and one or more of the carbon lines lying in the UV region are compared with one another. It has been proven to be expedient in this connection to detect the lines of the elements which are being compared to one another by means of secondary electron multipliers, and in connection therewith, as measurement for the beryllium concentration in the graphite matrix and thus as measurement for the consumption, to determine the ratio of the charge of the secondary electron multiplier, which with an excitation operation has passed over the beryllium lines, to the charge of the secondary electron multiplier responding to the carbon lines selected for the determination.

Since the method according to the invention for determining the consumption of nuclear fuel elements depends upon the identification of one element, namely beryllium, which is generated during the irradiation of the carbon during the insertion in the reactor with energy rich neutrons, a doping is unnecessary. In this manner, the unfavorable side effects inherent to a doping are also avoided. There is a further advantage to the method according to the invention in that the diffusion of beryllium out of the graphite material of the fuel element into the cooling circuit is small. As a further advantage, the electropositive property of beryllium makes possible a practically complete removal of beryllium which by chance enters the cooling gas, said removal being accomplished by means of ion exchanges, which are provided anyway for the gas purification.

EXAMPLE

Cylindrical samples measuring 30mm by 6mm $\phi$ are taken out of reactor neutron irradiated and non-irradiated ballshaped elements, the outer covering of which is of graphite. With an irradiation duration totalling three years, the fast neutron dose of the irradiated sample amounts to about $6 \times 10^{21}$ nvt. The temperature varies corresponding to the course of the reactor output; its maximum value is 900°C. The fuel elements are subjected to a spectral analytical investigation by means of a 3m concave grating spectrograph having 20,000 lines/inch. The width of the slit is 25$\mu$m. An externally ignited direct current arc of 10 A. arc thickness is used for excitation. The electrodes consist of spectrally pure graphite. The photometric evaluation, with the aid of the lines at 2348.61 A., 3130.42 A., and 3131.01 A., yields the unequivocal evidence for the beryllium arising from nuclear transformation. A contamination of the graphite with beryllium was not present as did result with the non-irradiated material according to the measurements carried out under the same conditions.

For purposes of standardizing, a graphite electrode doped with beryllium is first consumed. The precision of the measurement results meets the desired requirements.

It is, of course, to be understood that the present invention is by no means limited to the specific description of the example, but also comprises any modifications within the scope of the appended claims.

What I claim is:

1. A spectral analytic method of determining the consumption of fuel elements for nuclear reactors, according to which the fuel is contained in a graphite covering, which includes in combination the steps of:
   establishing an electric arc;
   volatizing traces of the component parts of the surface of a fuel element in said electric arc;
   splitting up the thus formed arc light;
   scattering the characterizing lines of the graphite and of the beryllium formed during irradiation in said reactor; and
   comparing the intensity proportions of at least one of the lines of said beryllium lying in the UV region and at least one of the lines of said graphite lying in the UV region.

2. A spectral analytic method of determining the consumption of nuclear fuel elements in combination according to claim 1, in which the arc light is split up by means of a UV-spectrograph.

* * * * *